(12) United States Patent
Nakanishi

(10) Patent No.: US 12,455,655 B2
(45) Date of Patent: Oct. 28, 2025

(54) SENSOR MODULE AND SENSOR DEVICE AND DISPLAY DEVICE INCLUDING THE SENSOR MODULE

(71) Applicant: Japan Display Inc., Tokyo (JP)

(72) Inventor: Takayuki Nakanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/632,472

(22) Filed: Apr. 11, 2024

(65) Prior Publication Data

US 2024/0393903 A1 Nov. 28, 2024

(30) Foreign Application Priority Data

May 25, 2023 (JP) ................................. 2023-086176

(51) Int. Cl.
G06F 3/041 (2006.01)
G06F 3/044 (2006.01)

(52) U.S. Cl.
CPC ........ G06F 3/0418 (2013.01); G06F 3/04164 (2019.05); G06F 3/0443 (2019.05); *G06F 2203/04107* (2013.01); *G06F 2203/04108* (2013.01); *G06F 2203/04112* (2013.01)

(58) Field of Classification Search
CPC .. G06F 3/0418; G06F 3/04164; G06F 3/0443; G06F 2203/04107; G06F 2203/04108; G06F 2203/04112; G06F 3/0412; G06F 3/0445; G06F 3/0446; G06F 3/0448; H10K 59/90
See application file for complete search history.

(56) References Cited

U.S. PATENT DOCUMENTS

| | | | | |
|---|---|---|---|---|
| 11,675,465 B2* | 6/2023 | Kim | ...................... | G06F 3/0443 345/174 |
| 11,733,801 B2* | 8/2023 | Knabenshue | ......... | G06F 3/0445 345/174 |
| 11,907,489 B2* | 2/2024 | Nakanishi | ............. | G06F 3/0444 |
| 12,124,650 B2* | 10/2024 | Lin | ...................... | G06F 3/0443 |
| 2013/0100038 A1* | 4/2013 | Yilmaz | ................. | G06F 3/0443 345/173 |
| 2013/0181943 A1* | 7/2013 | Bulea | ...................... | G06F 3/041 345/174 |
| 2013/0342498 A1 | 12/2013 | Kim et al. | | |
| 2014/0049486 A1* | 2/2014 | Kim | ...................... | G06F 3/0446 345/173 |
| 2014/0049508 A1 | 2/2014 | Kim et al. | | |

(Continued)

*Primary Examiner* — Benyam Ketema
(74) *Attorney, Agent, or Firm* — K&L Gates LLP

(57) ABSTRACT

Disclosed is a sensor module including a plurality of sensor electrodes, a sensor region, a frame region, a plurality of first terminals and a plurality of second terminals, a plurality of sensor wirings, and a plurality of first active-shield wirings. The plurality of sensor electrodes is arranged in a matrix shape having n rows including a first row to an nth row and m columns including a first column to an mth column. The sensor region encompasses the plurality of sensor electrodes. The frame region surrounds the sensor region. The plurality of first terminals and the plurality of second terminals are arranged in a region opposite to the nth row located in the frame region. The plurality of first active-shield wirings is electrically independent from the plurality of sensor electrodes.

20 Claims, 13 Drawing Sheets

(56) References Cited

U.S. PATENT DOCUMENTS

| | | | |
|---|---|---|---|
| 2014/0132335 A1* | 5/2014 | Rauhala | H03K 17/9622 |
| | | | 327/517 |
| 2015/0145823 A1* | 5/2015 | Liu | G06F 3/0448 |
| | | | 345/174 |
| 2015/0193081 A1* | 7/2015 | Liu | G06F 3/04164 |
| | | | 345/174 |
| 2016/0209965 A1* | 7/2016 | Kim | G06F 3/0443 |
| 2016/0266693 A1* | 9/2016 | Chen | G06F 3/0443 |
| 2018/0157354 A1* | 6/2018 | Blondin | G06F 3/04164 |
| 2019/0258345 A1* | 8/2019 | Lin | G06F 3/044 |
| 2019/0339799 A1* | 11/2019 | Blondin | G06F 3/04166 |
| 2021/0026474 A1* | 1/2021 | Yi | G06F 3/04164 |
| 2021/0026479 A1* | 1/2021 | Lee | G06F 3/0443 |
| 2021/0296421 A1* | 9/2021 | Moon | H10K 59/873 |
| 2023/0072599 A1* | 3/2023 | Nakanishi | G06F 3/0443 |
| 2023/0107028 A1* | 4/2023 | Nakano | G06F 3/0445 |
| | | | 345/173 |

* cited by examiner

100

SENSOR MODULE AND SENSOR DEVICE AND DISPLAY DEVICE INCLUDING THE SENSOR MODULE

CROSS-REFERENCE TO RELATED APPLICATIONS

This application claims the benefit of priority to Japanese Patent Application No. 2023-086176, filed on May 25, 2023, the entire contents of which are incorporated herein by reference.

FIELD

An embodiment of the present invention relates to a sensor module and a sensor device and a display device including the sensor module. For example, an embodiment of the present invention relates to a non-contact type sensor module and a sensor device and a display device including the non-contact type sensor module.

BACKGROUND

Touch sensor modules have been widely used as one type of interface for inputting information into information terminals. Currently mainstream touch sensor modules identify the position where a person's finger or hand directly contacts the touch sensor module. In contrast, non-contact type sensor (hover sensor) modules have been developed in recent years, which enable information input simply by positioning an inputting jig such as a person's finger, palm, and a touch pen (hereinafter, also referred to as an input means) close to the touch sensor module without contacting the input means with the touch sensor module (see US Patent Application Publications No. 2014/0049486, 2013/0342498, and 2014/0049508).

SUMMARY

An embodiment of the present invention is a sensor module. The sensor module includes a plurality of sensor electrodes, a sensor region, a frame region, a plurality of first terminals and a plurality of second terminals, a plurality of sensor wirings, and a plurality of first active-shield wirings. The plurality of sensor electrodes is arranged in a matrix shape having n rows including a first row to an nth row and m columns including a first column to an mth column. The sensor region encompasses the plurality of sensor electrodes. The frame region surrounds the sensor region. The plurality of first terminals and the plurality of second terminals are arranged in a region opposite to the mth row located in the frame region. The plurality of first active-shield wirings is electrically independent from the plurality of sensor electrodes. Each of the plurality of sensor wirings electrically connects a corresponding one of the plurality of sensor electrodes to a corresponding one of the plurality of first terminals. Each of the plurality of first active-shield wirings is electrically connected to a corresponding one of the plurality of second terminals and extends in a column direction of the plurality of sensor electrodes from the corresponding one of the second terminals. Two adjacent first active-shield wirings of the plurality of first active-shield wirings sandwich one of the plurality of sensor wirings in a row direction of the plurality of sensor electrodes. m and n are each independently an integer equal to or greater than 2.

An embodiment of the present invention is a sensor module. The sensor module includes a plurality of sensor electrodes arranged in a matrix shape, a plurality of sensor wirings, and two first active-shield wirings. Each of the plurality of sensor wirings is connected to a corresponding one of the plurality of sensor electrodes. The two first active-shield wirings sandwich one of the plurality of sensor wirings and one of the plurality of sensor electrodes. A first voltage applied to the plurality of sensor wirings and a second voltage applied to the two first active-shield wirings are in the same phase.

An embodiment of the present invention is a sensor device. The sensor device includes the sensor module, a connector electrically connected to the plurality of terminals, and a control circuit mounted over the connector and configured to sense a potential fluctuation of the plurality of sensor electrodes.

An embodiment of the present invention is a display device. The display device includes a display module having a plurality of pixels and the sensor device located over the display module.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate. The reference number is used when plural structures which are the same as or similar to each other are collectively represented, while a hyphen and a natural number are further used when these structures are independently represented. When a portion of a structure is represented, a lower-case letter of the alphabet may follow the reference number.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "a structure is exposed from another structure" means a mode in which a part of the structure is not covered by the other structure and includes a mode where the part uncovered by the other structure is further covered by another structure. In addition, a mode expressed by this expression includes a mode where a structure is not in contact with other structures.

In the embodiments of the present invention, when a plurality of films is formed with the same process at the same time, these films have the same layer structure, the same material, and the same composition. Hence, the plurality of films is defined as existing in the same layer.

Hereinafter, a structure of a sensor module according to an embodiment of the present invention as well as a sensor device and a display device including the sensor module are explained.

1. OVERALL STRUCTURE OF SENSOR MODULE

Figure 1:
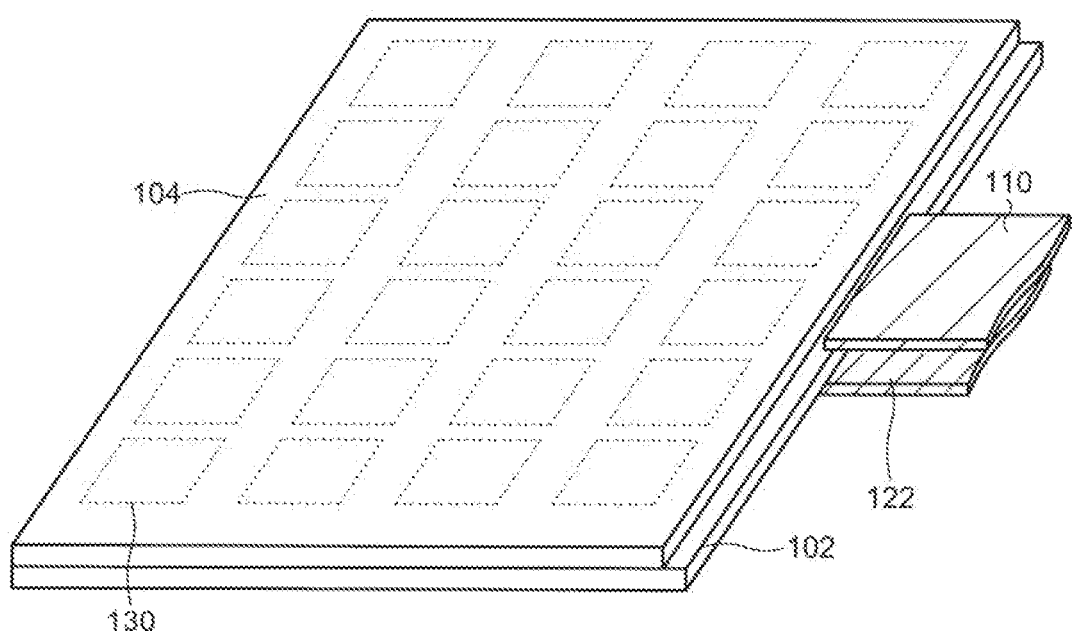
FIG. 1 is a schematic perspective view of a sensor module according to an embodiment of the present invention.
Figure 2:
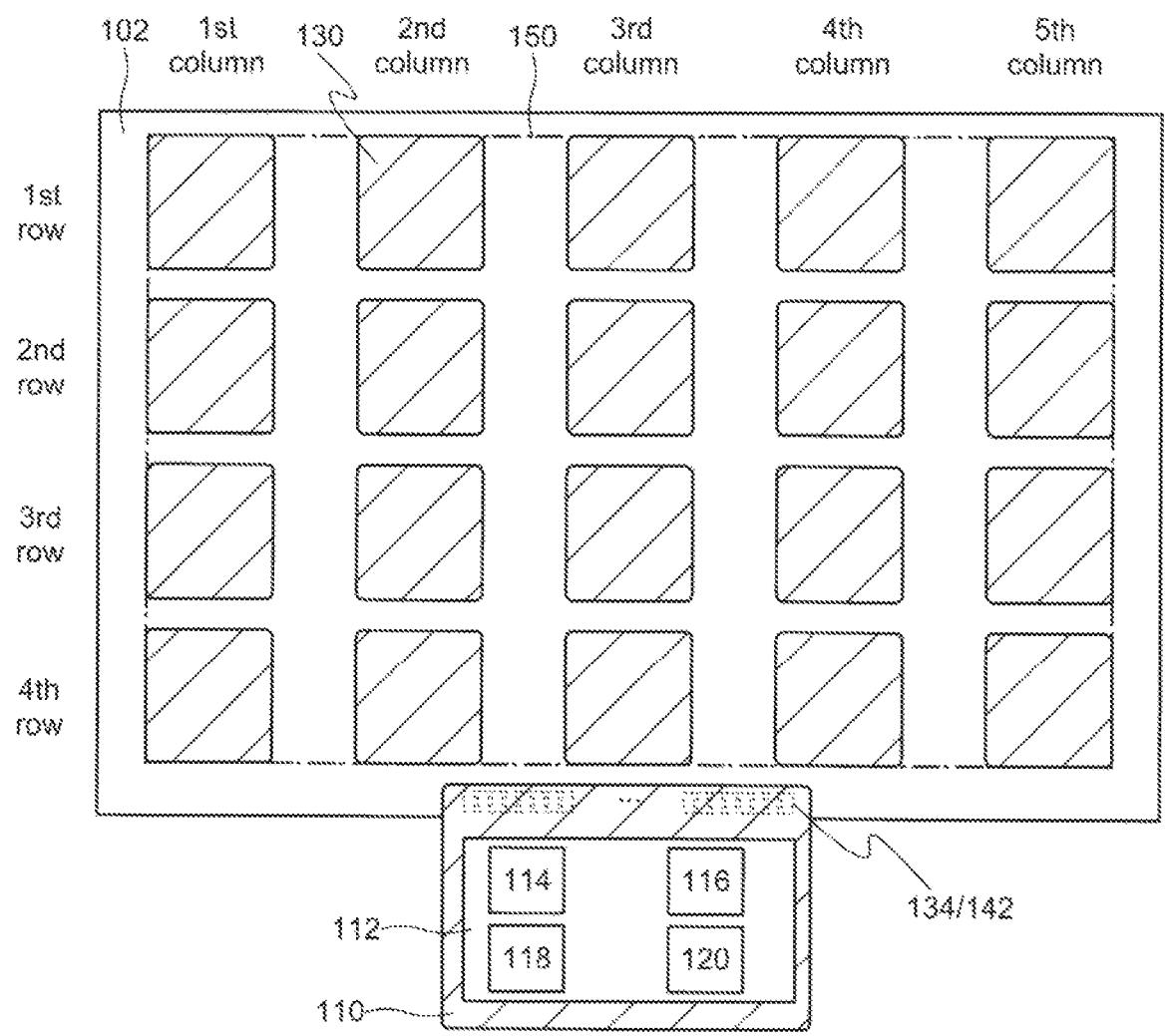
FIG. 2 is a schematic top view of a sensor module according to an embodiment of the present invention.

Schematic perspective and top views of the sensor module 100 are respectively illustrated in FIG. 1 and FIG. 2. The sensor module 100 is a so-called non-contact type sensor module, which detects an input means and has a function to identify the position of the input means over the sensor module not only when the input means such as fingers, palms, and touch pens equipped with a plastic tip at an end thereof contacts the sensor module 100, but also when the input means is arranged close to the sensor module 100 without contacting the sensor module 100 (for example, within 5 mm, 10 mm, or 20 mm from the outermost surface of the sensor module 100).

As shown in FIG. 1, the sensor module 100 has a first substrate 102 and a second substrate 104 facing each other, and a plurality of sensor electrodes 130 is provided between the first substrate 102 and the second substrate 104. As shown in FIG. 2, the plurality of sensor electrodes 130 is arranged in a matrix shape having a first row to a mth row and a first column to a nth column (m and n are each independently an integer equal to or greater than 2). In the example shown in FIG. 2, 20 sensor electrodes 130 arranged in a matrix shape of 4 rows and 5 columns are disposed in the sensor module 100. The number (i.e., m and n), the size, and the shape of the sensor electrodes 130 may be appropriately set according to the size of the sensor module 100 and the detection accuracy required for the sensor module 100, and the like. Here, the smallest rectangular region encompassing all of the sensor electrodes 130 (the region surrounded by the chain line in FIG. 2) is called a sensor region 150, while the region surrounding the sensor region 150 is called a frame region.

As described below, a variety of wirings (sensor wirings, first active-shield wirings, and the like) which are not depicted in FIG. 2 are provided over the first substrate 102, and the end portions of these wirings form terminals (first terminals 134 and second terminals 142) or are connected to terminals. The plurality of first terminals 134 and the plurality of second terminals 142 are arranged on one side of the sensor region 150 (e.g., on the mth row side of the frame region) in the frame region.

A first connector 110 such as a flexible printed circuit (FPC) board is electrically connected to the plurality of first terminals 134 and the plurality of second terminals 142, and the first connector 110 is connected to an external circuit which is not illustrated. A control circuit 112 configured to detect potential fluctuations of the plurality of sensor electrodes 130 is mounted over the first connector 110, and the sensor device according to an embodiment of the present invention is configured with the control circuit 112 and the sensor module 100.

The control circuit 112 may be composed of a power circuit 114, a detector 116, an arithmetic element 118, an interface 120, and the like. The power circuit 114 converts power supplied from an external circuit into a pulsed AC voltage and supplies this AC voltage to each sensor electrode 130 through the first terminals 134 and the sensor wirings. The detector 116, also called an analog front end (AFE), detects the changes in the capacitance of the sensor electrodes 130 as potential fluctuations and digitizes these potential fluctuations into detection signals. The detection signals generated by the detector 116 are input to the arithmetic element 118, and the coordinates representing the position of the input means are generated by the arithmetic element 118 on the basis of these detection signals. The detector 116 and the arithmetic element 118 may be configured as a single integrated circuit (IC) chip. The interface 120 is used for the connection with the external circuit and is configured on the basis of a standard such as the Universal Serial Bus (USB) or the Serial Peripheral Interface (SPI).

Hereinafter, each component of the sensor module 100 is explained in detail.

2. FIRST SUBSTRATE AND SECOND SUBSTRATE

The first substrate 102 and the second substrate 104 include an insulating material. For example, the first substrate 102 and the second substrate 104 are composed of glass, quartz, or a polymeric material such as a polyimide, a polyamide, or a polycarbonate. The first substrate 102 and the second substrate 104 may be configured to transmit visible light or may be configured not to transmit visible light. When the sensor module 100 is used in the display device described below, the sensor module 100 can be utilized as a user interface arranged over the display module, and the display on the display module can be used to input information. In this case, the first substrate 102 and the second substrate 104 are configured to transmit visible light so that the display on the display module can be viewed.

3. SENSOR ELECTRODE

Figure 3:
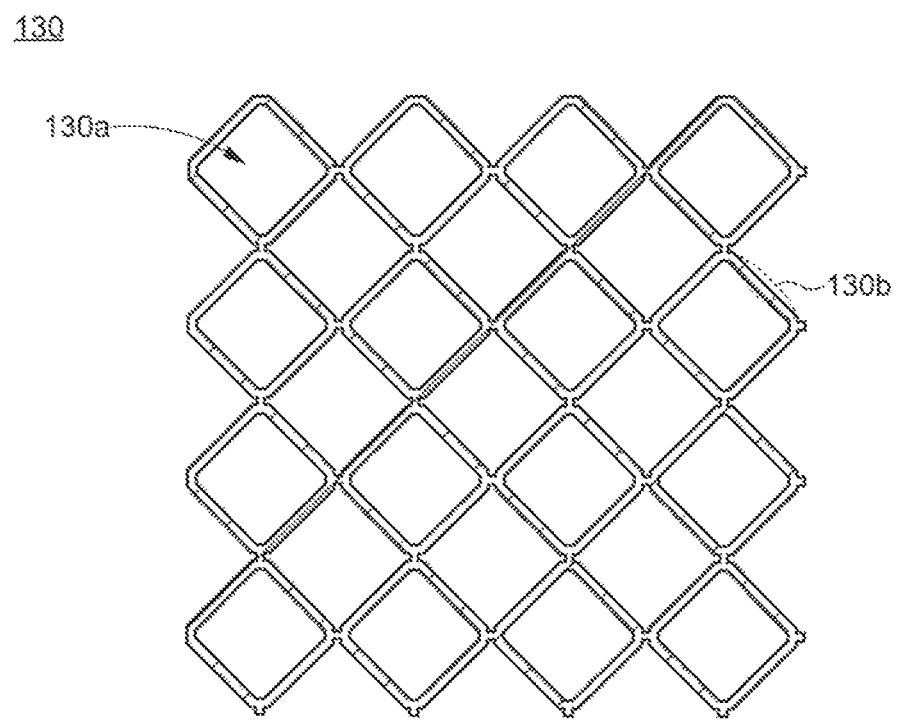
FIG. 3 is a schematic top view of a portion of a sensor wiring arranged in a sensor module according to an embodiment of the present invention.

The sensor electrode 130 includes a conductive oxide transmitting visible light such as indium-tin oxide (ITO) and indium-zinc oxide (IZO) or a metal (0-valent metal) such as molybdenum, tungsten, tantalum, aluminum, and copper. The sensor electrode 130 may have a single-layer structure or a stacked-layer structure. For example, the sensor electrode 130 may have a stacked structure of a layer containing a conductive oxide and a layer containing a metal. Preferably, the sensor electrode 130 is configured to include a metal so that high conductivity can be achieved. In the case of the sensor electrode 130 including a metal, the sensor electrode 130 is preferably configured to have a mesh shape with a plurality of openings 130a which are regions surrounded by frames 130b arranged in a lattice shape as shown in FIG. 3. This configuration allows the sensor module 100 to have high transparency with respect to visible light, while maintaining high conductivity. The area of the opening 130a may be set, for example, to be equal to or greater than $4 \times 10^3$ $\mu m^2$ and equal to or less than $5 \times 10^4$ $\mu m^2$.

4. SENSOR WIRING AND FIRST ACTIVE-SHIELD WIRING

Figure 4:
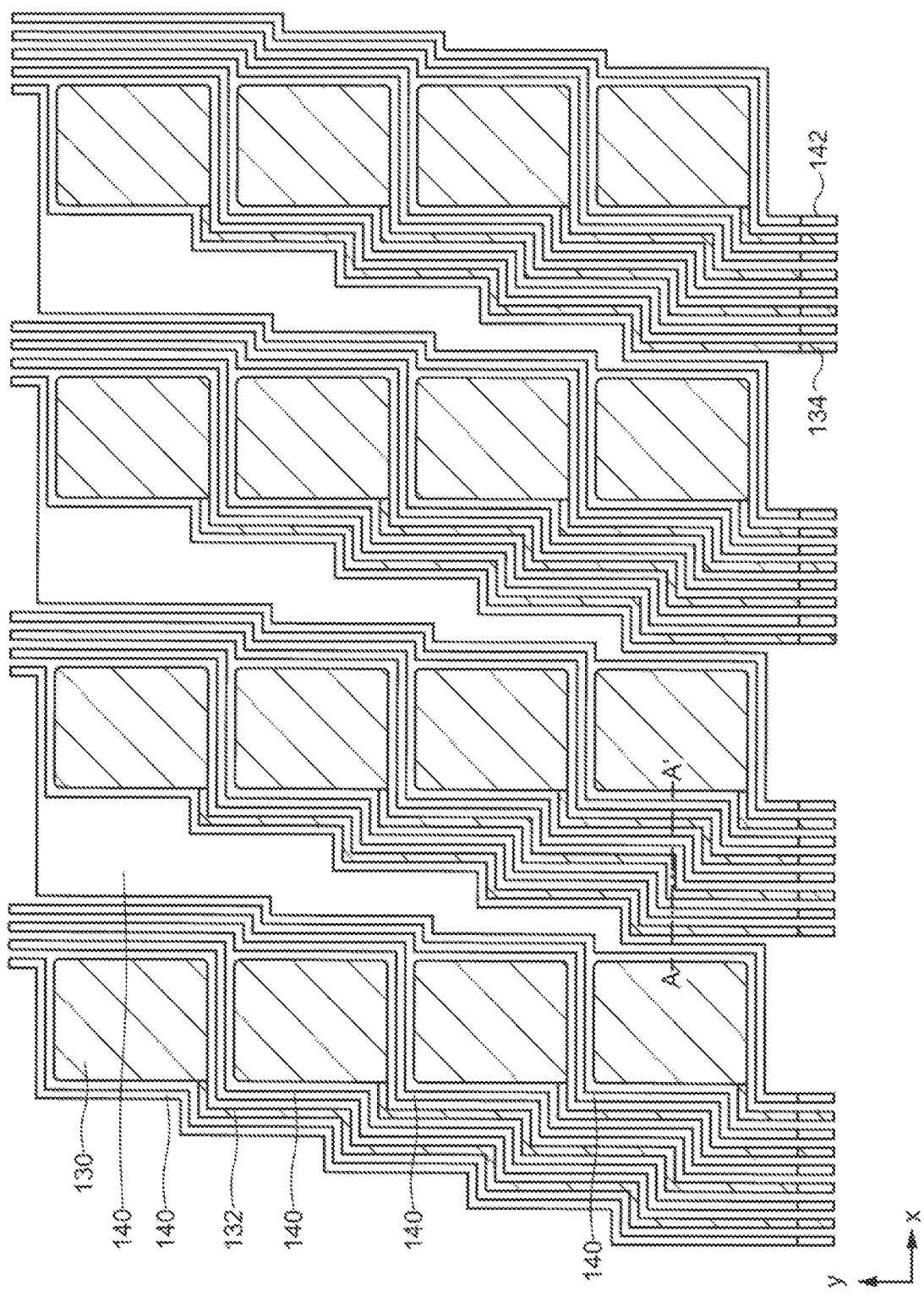
FIG. 4 is a schematic top view of a portion of a sensor module according to an embodiment of the present invention.

FIG. 4 shows a schematic top view of the sensor module 100. As shown in this drawing, each sensor electrode 130 is provided with a corresponding sensor wiring 132. That is, the sensor module 100 is provided with a plurality of sensor wirings 132 in the same number as the sensor electrodes 130, where one sensor wiring 132 is electrically connected to one sensor electrode 130 and forms or is connected to the first terminal 134, by which the sensor electrode 130 is electrically connected to the first terminal 134. Each sensor wiring 132 also connects the corresponding sensor electrode 130 to the corresponding first terminal 134 without any other sensor electrode 130. In other words, one sensor wiring 132 is not connected to a plurality of sensor electrodes 130, and similarly, one sensor electrode 130 is not connected to a plurality of sensor wiring 132. A pulsed AC voltage is applied to the plurality of sensor wirings 132 from the control circuit 112.

Furthermore, each sensor wiring 132 is provided so as not to overlap the sensor electrodes 130 connected to other sensor wirings 132 in the normal direction of the first substrate 102. In other words, each sensor wiring 132 is arranged to be completely exposed from all of the sensor electrodes 130 other than at least the sensor electrode 130 connected to said sensor wiring 132. This configuration prevents each sensor wiring 132 from forming a capacitance (parasitic capacitance) with the sensor electrodes 130 other than the sensor electrode 130 to which said sensor wiring 132 is connected.

In addition, the sensor module 100 is provided with a plurality of first active-shield wirings 140. The plurality of first active-shield wirings 140 is physically spaced away and electrically independent from all of the sensor electrodes 130 and the sensor wirings 132. The end portions of the first active-shield wirings 140 have or are connected to the second terminals 142 located in the frame region. The first active-shield wirings 140 are supplied with a pulsed AC voltage in the same phase as the sensor wirings 132 from the control circuit 112 through the second terminals 142. However, all of the first active-shield wirings 140 are electrically connected to one another over the first substrate 102 or over the first connector 110 to be equipotential at all times. Note that, since the first active-shield wirings 140 do not contribute to the identification of the coordinates of the input means, they need not be connected to the detector 116.

As shown in FIG. 4, each of the first active-shield wirings 140 extends in the column direction (y direction in FIG. 4) as a whole from the second terminal 142 to its opposite side (first row side). The first active-shield wiring 140 may be arranged so that at least a portion thereof traverses the sensor region 150. That is, the opposite end portion with respect to the second terminal 142 may be located in the frame region on the opposite side (first row side) to the side where the second terminal 142 is provided. Here, each sensor wiring 132 is sandwiched in the row direction (x direction in FIG. 4) by the first active-shield wirings 140 adjacent to each other. More specifically, the sensor wiring 132 electrically connected to one sensor electrode 130 is sandwiched in the row direction by two first active-shield wirings 140 adjacent to each other. In other words, two sensor wirings 132 connected to two sensor electrodes 130 adjacent to each other in the column direction are adjacent to each other through one first active-shield wiring 140. Thus, when each sensor electrode 130 has one sensor wiring 132, the plurality of sensor wirings 132 and the plurality of first active-shield wirings 140 alternate in the row direction.

Furthermore, each sensor electrode 130 is sandwiched in the column direction by adjacent first active-shield wirings 140 adjacent in the row direction. Accordingly, a portion of the plurality of first active-shield wirings 140 extends in a region between the sensor electrodes 130 adjacent in the column direction.

A distance (gap) between adjacent sensor wiring 132 and first active-shield wiring 140, a distance between adjacent first active-shield wirings 140, and a distance between adjacent first active-shield wiring 140 and sensor electrode 130 are preferred to be constant. Therefore, the width (distance in the row or column direction) of a portion of the first active-shield wirings 140 may vary from row to row depending on the layout of the sensor electrodes 130. In the example shown in FIG. 4, the width of a portion of the first active-shield wirings 140 increases stepwise with increasing distance from the second terminals 142.

Figure 5:
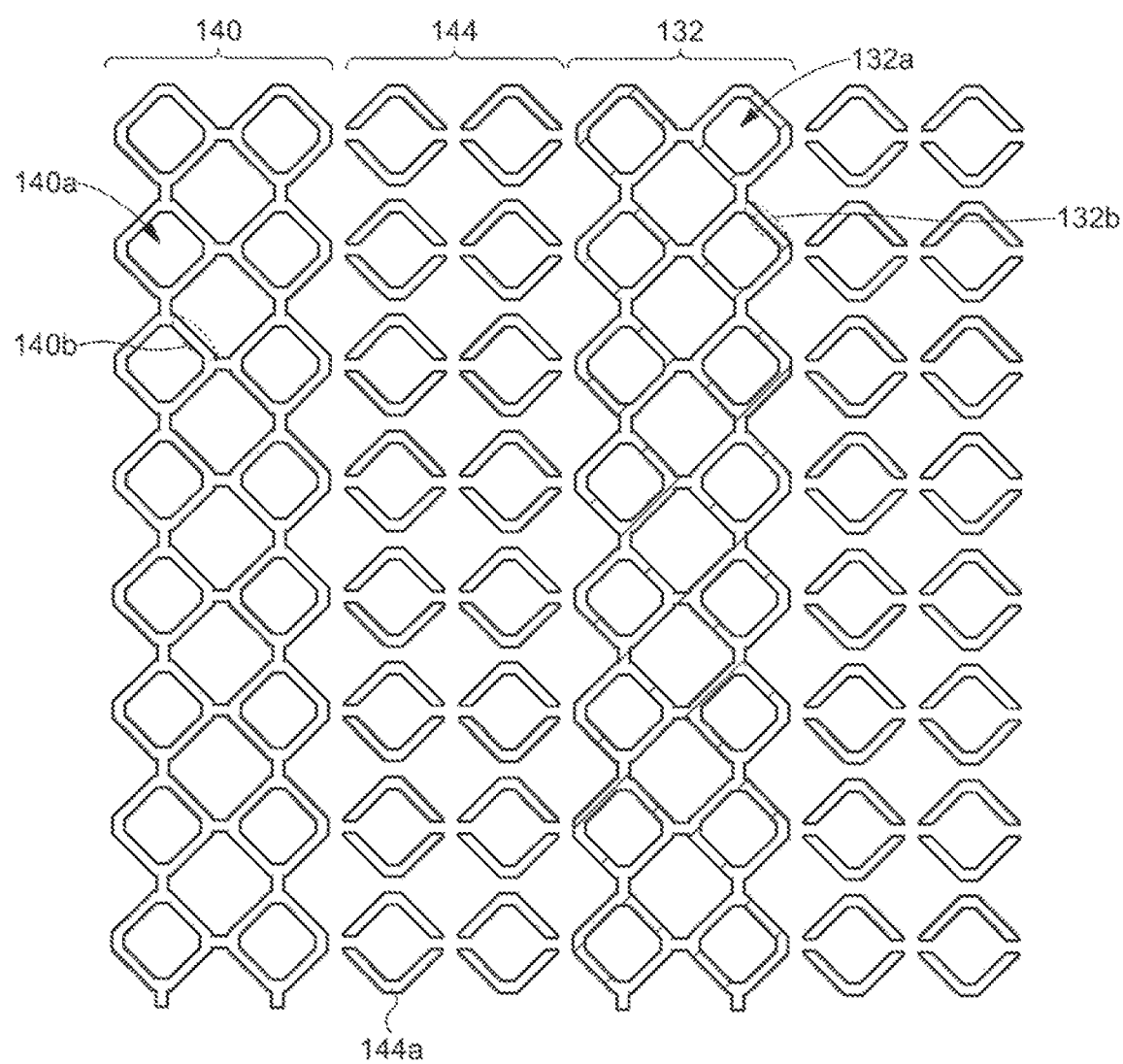
FIG. 5 is a schematic top view of a portion of a sensor wiring, a first active-shield wiring, and an insulating region arranged in a sensor module according to an embodiment of the present invention.

Similar to the sensor electrode 130, the sensor wiring 132 and the first active-shield wiring 140 may be formed to include the aforementioned conductive oxide or 0-valent metal transmitting visible light. The sensor wiring 132 and the first active-shield wiring 140 may also have a single-layer structure or may have a structure in which a layer containing a conductive oxide and a layer containing a metal are stacked. Similar to the sensor electrode 130, the sensor wiring 132 and the first active-shield wiring 140 are preferably configured to include a metal so that high conductivity can be achieved. In this case, it is preferable to configure the sensor wiring 132 and the first active-shield wiring 140 in a mesh shape having a plurality of openings 132a and 140a respectively formed by the frames 132b and 140b arranged in a lattice shape as shown in FIG. 5. This configuration allows the sensor module 100 to have high transparency to visible light while maintaining high conductivity. The areas of the openings 132a and 140a may also be set to be equal to or greater than $4 \times 10^3$ μm$^2$ and equal to or less than $5 \times 10^4$ μm$^2$, for example. Preferably, the sensor electrode 130, the sensor wiring 132, and the first active-shield wiring 140 are configured to have the same or substantially the same mesh pattern. That is, the shape, the size, and the pitch of the openings 130a of the mesh of the sensor electrode 130 are preferably the same or substantially the same as the shapes, the sizes, and the pitches of the openings 132a and 140a of the meshes of the sensor wiring 132 and the first active-shield wiring 140, respectively. It is possible to prevent the generation of moiré by providing the same mesh shape to the sensor wiring 132, the sensor electrode 130, and the first active-shield wiring 140.

Furthermore, it is preferred to provide a dummy pattern 144 including a 0-valent metal in an insulating region, i.e., between the sensor electrode 130 and the sensor wiring 132 which are not electrically connected to each other, between adjacent sensor wiring 132 and first active-shield wiring 140, and between adjacent sensor electrode 130 and first active-shield wiring 140, and the like as shown in FIG. 5. In the dummy pattern 144, a plurality of conductive films 144a having the same shape as the frames 132b, 130b, and 140b which structure the mesh shape of the sensor wiring 132, the sensor electrode 130, or the first active-shield wiring 140 is arranged and electrically insulated from one another. Each conductive film 144a may have a bent V-shape as shown in FIG. 5 or may be a straight thin line shape. The extending direction of the straight sections of each conductive film 144a may be parallel to the extending direction of the frames 132b, 130b, or 140b. Therefore, the same optical characteristics as those of the sensor wiring 132, the sensor electrode 130, and the first active-shield wiring 140 can be imparted in the insulating region. As a result, the generation of moiré can be prevented over the entire sensor region 150.

Figure 6A:
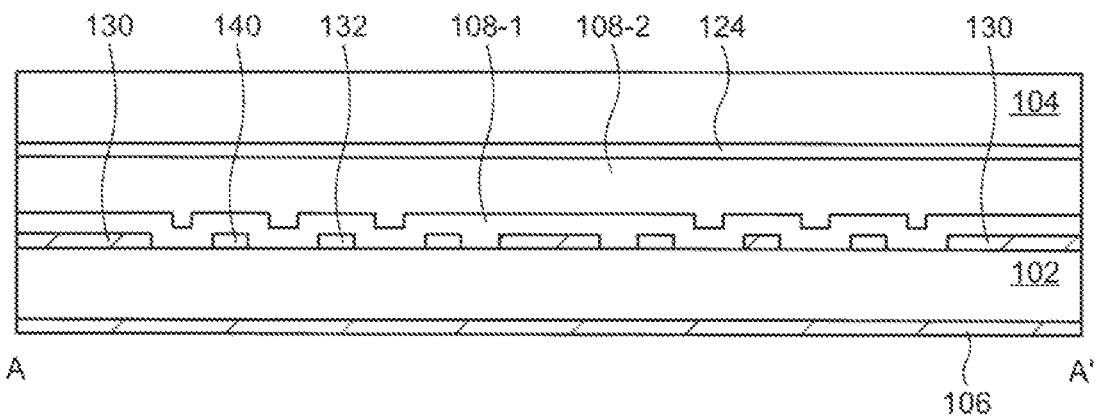
FIG. 6A is a schematic cross-sectional view of a portion of a sensor module according to an embodiment of the present invention.
Figure 6B:
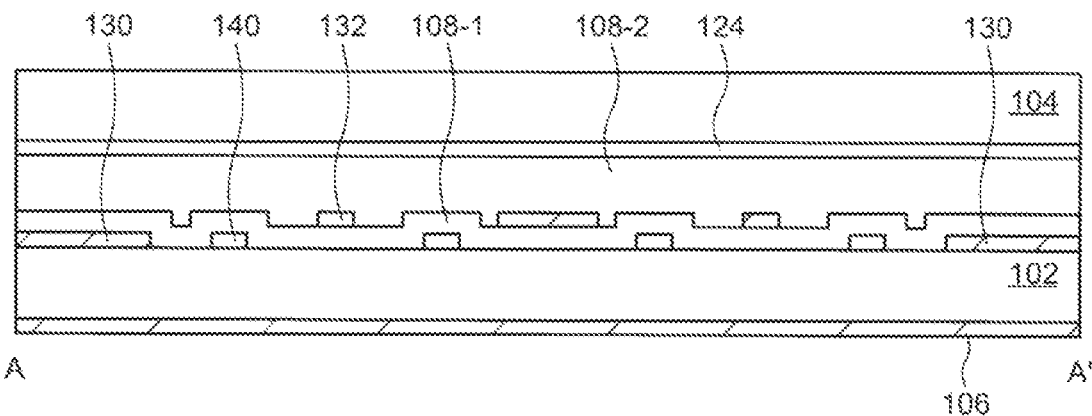
FIG. 6B is a schematic cross-sectional view of a portion of a sensor module according to an embodiment of the present invention.
Figure 6C:
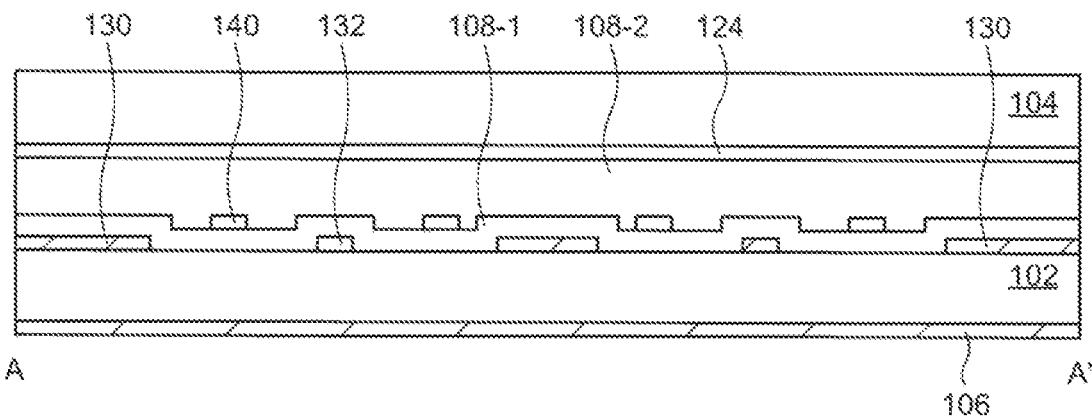
FIG. 6C is a schematic cross-sectional view of a portion of a sensor module according to an embodiment of the present invention.

Schematic views of the cross section along the chain line A-A' in FIG. 4 are shown in FIG. 6A to FIG. 6C. As shown in these drawings, the sensor electrode 130, the sensor wiring 132, and the first active-shield wiring 140 are provided over the first substrate 102 directly or through an insulating undercoat which is not illustrated. One or a plurality of protective films 108 is provided over the sensor electrode 130, the sensor wiring 132, and the first active-shield wiring 140, and the protective films 108 and the second substrate 104 are fixed by an adhesive layer 124. FIG. 6A shows the protective film 108, as an example, in which a first protective film 108-1 containing a silicon-containing inorganic compound such as silicon oxide and silicon nitride and a second protective film 108-2 containing a polymer such as an epoxy resin, an acrylic resin, and a silicone resin are stacked.

As shown in FIG. 6A, all of the sensor electrode 130, the sensor wiring 132, and the first active-shield wiring 140 may be formed in the same layer. That is, the sensor electrode 130, the sensor wiring 132, and the first active-shield wiring 140 having the same composition may be formed in the same process. Alternatively, one of the first active-shield wiring 140, the sensor electrode 130, and the sensor wiring 132 may be formed in a different layer. For example, the sensor electrode 130 and the first active-shield wiring 140 having the same composition may be formed in the same process, and the sensor wiring 132 may be provided over the first protective film 108-1 covering the sensor electrode 130 and the first active-shield wiring 140 as shown in FIG. 6B. In this case, the sensor electrode 130 and the sensor wiring 132 are electrically connected through an opening (not illustrated) formed in the first protective film 108-1. The composition of the sensor wiring 132 may be the same as or different from the compositions of the sensor electrode 130 and the first active-shield wiring 140. Alternatively, the sensor electrode 130 and the sensor wiring 132 having the same composition may be formed in the same process, and the first active-shield wiring 140 may be provided over the first protective film 108-1 covering the sensor electrode 130 and the sensor wiring 132 as shown in FIG. 6C. The composition of the first active-shield wiring 140 may be the same as or different from the compositions of the sensor electrode 130 and the sensor wiring 132.

Note that a noise-shield layer 106 may be arranged, as an optional component, under the first substrate 102 to prevent the influence of electromagnetic waves and the like from the first substrate 102 side. The noise-shield layer 106 includes a light-transmitting oxide having conductivity such as ITO or IZO or a metal. In the latter case, a mesh-shaped metal film with a plurality of openings may be used as the noise-shield layer 106 to allow transmission of visible light. The noise-shield layer 106 is provided so as to overlap the plurality of sensor electrodes 130. A second connector 122 such as an FPC substrate is electrically connected to the noise-shield layer 106 (see FIG. 1), and a pulsed AC voltage in the same phase as the potential applied to the sensor electrodes 130 is applied to the noise-shield layer 106. Therefore, the noise-shield layer 106 is always equipotential with the sensor electrodes 130. In the case where the sensor module 100 is operated in an electronic device equipped with a display device in which the sensor module 100 is arranged over the display module, for example, the formation of the noise-shield layer 106 effectively prevents the influence of electromagnetic waves emitted by the display device and the electronic device. As a result, malfunctioning of the sensor module 100 can be prevented, and the input means can be more accurately identified.

As described above, a pulsed AC voltage with the same phase is applied to the sensor electrodes 130 through the sensor wirings 132. When the input means approaches or contacts the sensor electrodes 130, a virtual capacitive element is formed between the input means and the sensor electrodes 130, resulting in a fluctuation in the potential of each sensor electrode 130. This potential fluctuation is detected and digitally converted by the detector 116 and acquired as a sensor value, and the position (coordinates) at which the input means approaches or contacts is identified on the basis of the position (coordinates) of each sensor electrode 130 and the sensor value thereof. Thus, the sensor module 100 functions as a capacitive (self-capacitive) non-contact type sensor.

However, when the input means approaches the sensor module 100, a capacitance is formed between one or a plurality of sensor electrodes 130 closest to the input means (hereinafter referred to as detection sensor electrodes), and the generation of this capacitance causes a potential change of the detection sensor electrodes, leading to the formation of a potential difference between these detection sensor electrodes and the sensor electrodes (peripheral sensor electrodes) surrounding the detection sensor electrodes. As a result, an unintended capacitance (parasitic capacitance) is formed between the detection sensor electrodes and the peripheral sensor electrodes. The same phenomenon occurs between the sensor wirings 132. As a result, the potential fluctuations of the sensor electrodes 130 and the sensor wirings 132 caused by the parasitic capacitance are detected as the potential fluctuations of the sensor electrodes 130, affecting the sensor values of the sensor electrodes 130 adjacent in the column direction. This phenomenon adversely affects the accurate identification of the detection position of the input means.

However, as described above, each sensor wiring 132 is sandwiched in the row direction by two first active-shield wirings 140 adjacent to each other in the row direction in the sensor module 100. Furthermore, each sensor electrode 130 is also sandwiched in the column direction by two active-shield wirings adjacent to each other in the row direction. Therefore, although a parasitic capacitance is formed between the sensor wiring 132 and the first active-shield wiring 140 and between the sensor electrode 130 and the first active-shield wiring 140, the parasitic capacitance formed between adjacent sensor wirings 132 and between adjacent sensor electrodes 130 can be significantly reduced. As a result, the influence on the sensor values of the sensor electrodes 130 located in the column direction with respect to the sensor electrode 130 with which the input means is in close proximity or in contact can be reduced, enabling accurate identification of the input means.

5. MODIFIED EXAMPLES (1) Modified Example 1

Figure 7:
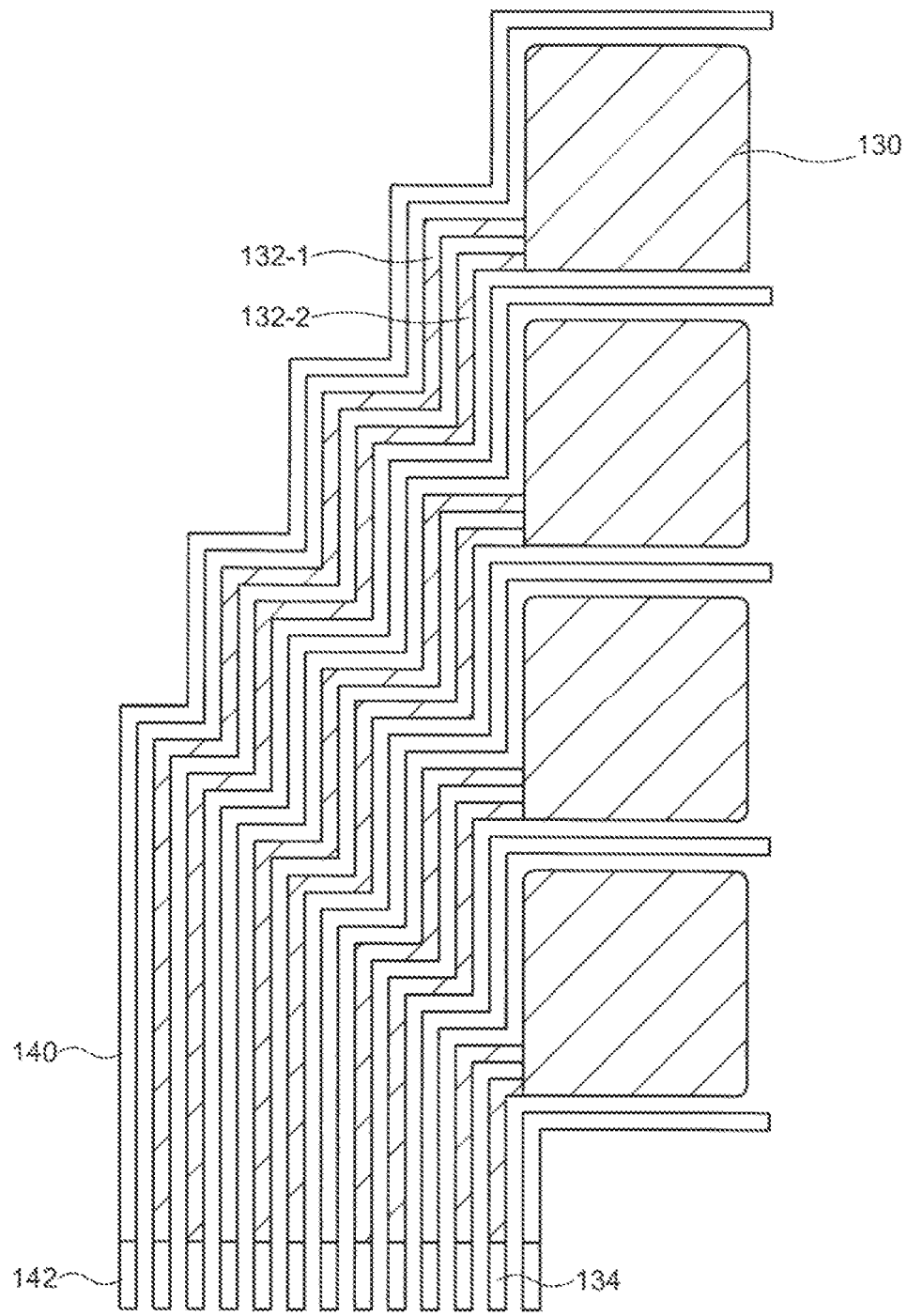
FIG. 7 is a schematic top view of a portion of a sensor module according to an embodiment of the present invention.

In the example described above, one sensor wiring 132 is connected to each sensor electrode 130, but a plurality of sensor wirings 132 may be connected to each sensor electrode 130. For example, two sensor wirings 132-1 and 132-2 may be connected to one sensor electrode 130 as shown in FIG. 7. The sensor wirings 132-1 and 132-2 may each form the first terminal 134 in the frame region, or these two sensor wirings 132-1 and 132-2 may be integrated to form a single first terminal 134 in the frame region. Since the control circuit 112 and the sensor electrode 130 can be connected by connecting the plurality of sensor wirings 132 to each sensor electrode 130 even if a portion of the sensor wirings 132 are disconnected, high reliability can be provided to the sensor module 100.

(2) Modified Example 2

As described above, the sensor electrodes 130 are arranged in a plurality of rows and a plurality of columns in the sensor module 100. The sensor wirings 132 connected to these sensor electrodes 130 extend toward the frame region on one side (mth row side) of the sensor region 150 to form the first terminals 134 at the edge portion of the first substrate 102. Hence, the density of the sensor wirings 132 increases as it approaches the first terminals 134. Thus, when the input means is proximate on the sensor electrode 130 of the first row which is far from the first terminal 134, for example, only the potentials of the sensor electrode 130 of the first row and the sensor wiring 132 connected thereto fluctuate so that the exact coordinates of the input means can be identified. However, when the input means comes into close proximity of the sensor electrode 130 located in a row close to the first terminal 134, e.g., the mth row, the input means can also come close to the densely arranged sensor wirings 132. Hence, not only does the potential of that sensor electrode 130 fluctuate, but also a virtual capacitive element may be formed in the sensor wirings 132 connected to the other sensor electrodes 130 in the same column. As a result, the potentials of the sensor electrodes 130 in the rows other than the mth row may also undergo fluctuations, which may inhibit identification of the exact coordinates of the input means.

Figure 8:
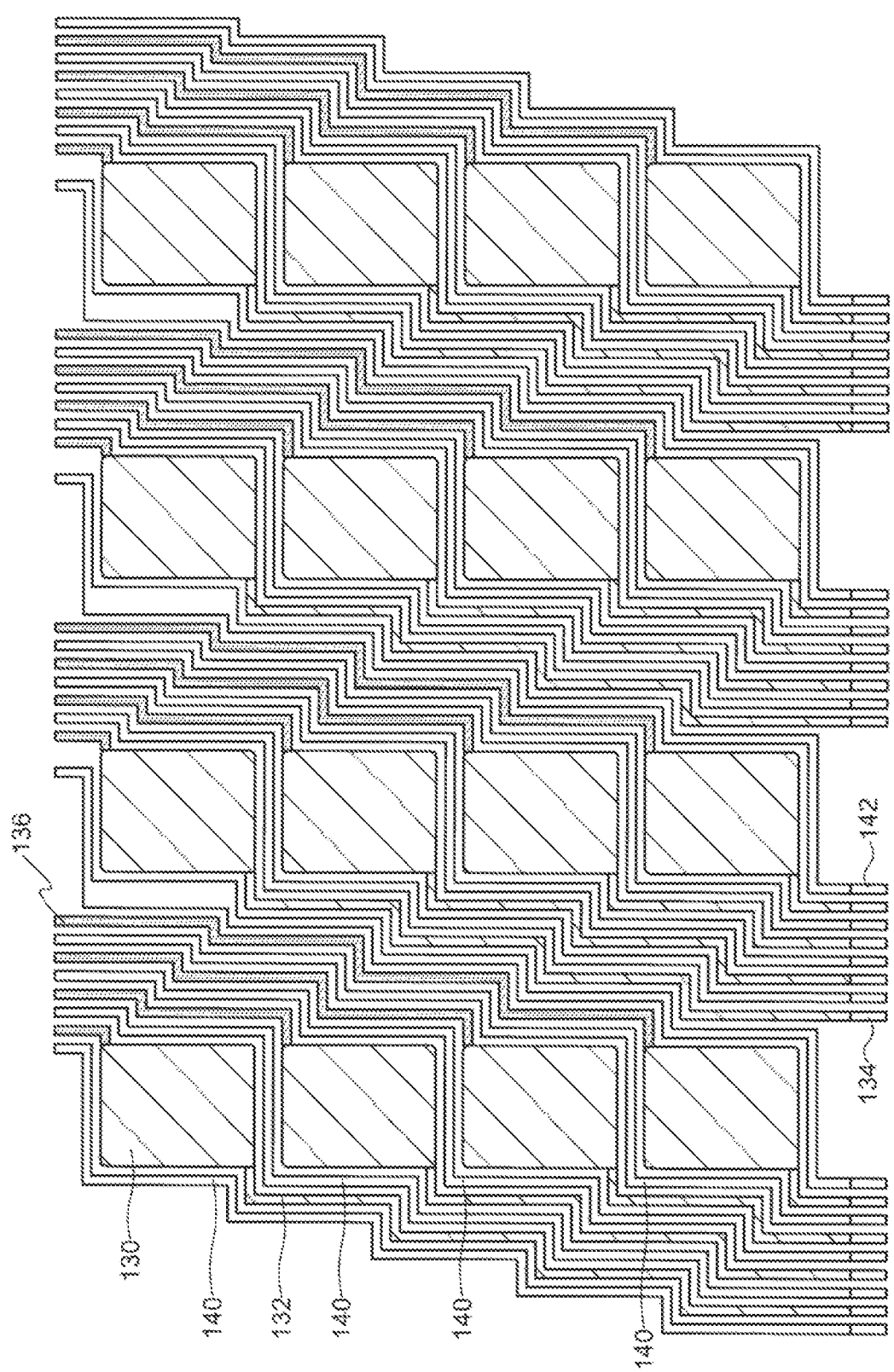
FIG. 8 is a schematic top view of a portion of a sensor module according to an embodiment of the present invention.

Therefore, an auxiliary wiring 136 different from the sensor wiring 132 may be provided to each sensor electrode 130 as shown in FIG. 8. Specifically, a plurality of auxiliary wirings 136 is respectively provided to the corresponding plurality of sensor electrodes 130. One auxiliary wiring 136 is selectively connected to one sensor electrode 130 and extends in the direction (first row side) opposite to the first terminals 134. The auxiliary wiring 136 is not connected to any other conductive components except for the sensor electrode 130 connected thereto. Thus, the auxiliary wiring 136 is also applied with the same voltage as the sensor electrode 130 to which the auxiliary wiring 136 is connected. Similar to the sensor wiring 132, each auxiliary wiring 136 does not overlap all of the sensor electrodes 130 except for at least the sensor electrode 130 connected thereto. That is, each auxiliary wiring 136 is exposed from all of the sensor electrodes 130 except for at least the sensor electrode 130 connected thereto. Each auxiliary wiring 136 may also be formed so as to exist in the same layer as the sensor electrode 130, the sensor wiring 132, and the first active-shield wiring 140. Preferably, the auxiliary wiring 136 is provided so that the opposite end portion of the auxiliary wiring 136 with respect to the sensor electrode 130 is located in the frame region. This configuration ensures that the virtual capacitance formed between the auxiliary wiring 136 and the input means, even if the input means is placed close to the edge portion of the sensor region 150. Hence, the same detection accuracy can be maintained as in other areas of the sensor region 150 (e.g., a region close to the center).

Each auxiliary wiring 136 may also be configured to include a conductive light-transmitting oxide or metal. In the latter case, the auxiliary wiring 136 may be configured to have a mesh shape similar to the sensor electrode 130, thereby moiré generation can be prevented while providing high light-transmitting properties with respect to visible light.

The first active-shield wirings 140 are arranged so that each auxiliary wiring 136 is sandwiched in the row direction by the first active-shield wirings 140 adjacent to each other. Furthermore, the plurality of first active-shield wirings 140 and the plurality of auxiliary wirings 136 alternate with each other in the row direction. Since this arrangement significantly reduces the parasitic capacitance between the auxiliary wirings 136 adjacent to each other, it is possible to reduce the influence on the sensor electrodes 130 located in the column direction relative to the sensor electrode 130 to which the input means is in close proximity or in contact.

The formation of the auxiliary wirings 136 in this way allows the density of the wirings, i.e., the sum of the areas of the sensor wiring 132 and auxiliary wiring 136 to be almost constant in the column direction. Therefore, when the input means comes close to the first terminals 134, for example, the largest potential fluctuation occurs at the sensor electrodes 130 in the row closest to the coordinates of the input means, while secondary potential fluctuations also occur at the sensor wirings 132 arranged close to the sensor electrodes 130 in this row and the sensor electrodes 130 located in other rows and connected to these sensor wirings 132. Similarly, when the input means is in close proximity to a position far from the first terminals 134, the largest potential fluctuation occurs at the sensor electrodes 130 of the row closest to the coordinates of the input means, while the secondary potential fluctuations occur at the auxiliary wirings 136 connected to the sensor electrodes 130 in the other rows, resulting in the secondary potential fluctuations at the sensor electrodes 130 of these rows. That is, while a large potential fluctuation at the sensor electrode 130 proximate to the input means can be sensed without depending on the coordinates of the input means, almost the same secondary potential fluctuations can be caused for other sensor electrodes 130 arranged in the column in which that sensor electrode 130 is arranged. As a result, the dependence of the secondary potential fluctuation on the coordinates of the input means is eliminated, and the coordinates of the input means can be accurately identified.

Furthermore, although the sensor wiring 132 is smaller in width than the sensor electrode 130, it also functions as a sensor electrode because a pulsed AC voltage is applied thereto. In addition, the sensor wiring 132 becomes longer as it moves away from the first terminal 134, whereas the auxiliary wiring 136 becomes shorter as it moves away from the first terminal 134. Therefore, the areas of the sensor wiring 132 and the auxiliary wiring 136 functioning as a portion of the sensor electrode 130 (the sensor electrode connected to the detector 116) are almost the same between the rows, which reduces the capacitance difference caused by the difference in distance from the detector 116. Note that the auxiliary wiring 136 may not be provided to the sensor electrode 130 located farthest from the detector 116.

(3) Modified Example 3

Figure 9:
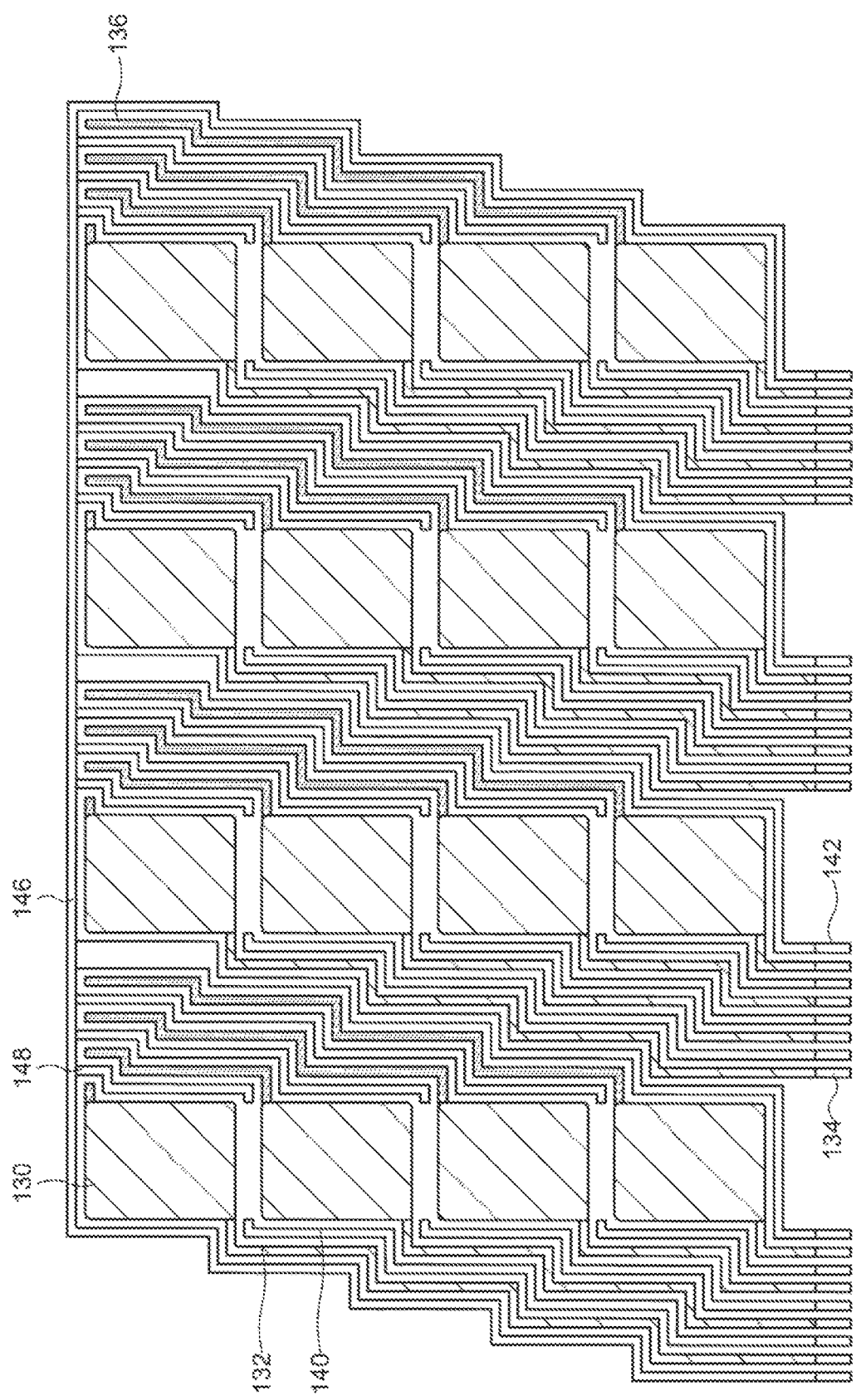
FIG. 9 is a schematic top view of a portion of a sensor module according to an embodiment of the present invention.

In the examples described above, since the first active-shield wiring 140 extends in an area between the sensor electrodes 130 adjacent in the column direction, each sensor electrode 130 is sandwiched in the column direction by the adjacent first active-shield wirings 140. The configuration of the sensor module 100 is not limited to this structure, and the first active-shield wiring 140 may be divided between the sensor electrodes 130 adjacent in the column direction as shown in FIG. 9. In this case, a lead wiring 146 may be provided in the frame region, and a plurality of second active-shield wirings 148 extending from the frame region on the first row side to the sensor region 150 may be connected to the lead wiring 146. The plurality of second active-shield wirings 148 is electrically connected to each other by the lead wiring 146 and is applied with a pulsed AC voltage with the same phase as the first active-shield wirings 140 from the control circuit 112. The plurality of second active-shield wirings 148 is arranged so that each auxiliary wiring 136 is sandwiched in the row direction by the second active-shield wirings 148 adjacent to each other.

In this configuration, a parasitic capacitance may be generated between the sensor electrodes 130 adjacent in the column direction. However, since the distance between adjacent sensor electrodes 130 is larger than the distance between adjacent sensor wirings 132, the influence of the parasitic capacitance between the sensor electrodes 130 adjacent in the column direction is small. Therefore, similar to the other examples described above, a large parasitic capacitance reduction effect can be obtained between adjacent sensor wirings 132, enabling the position of the input means to be accurately identified.

(4) Modified Example 4

Non-contact type sensors are more susceptible to external electrical influences than the conventional contact-type sensors. This influence is particularly prominent in the sensor electrodes 130 located close to the periphery of the sensor region 150. In order to reduce this influence, a plurality of dummy electrodes may be arranged in the frame region, which is peripheral to the sensor region 150, so as to surround the sensor region 150 as shown in FIG. 10.

Figure 11:
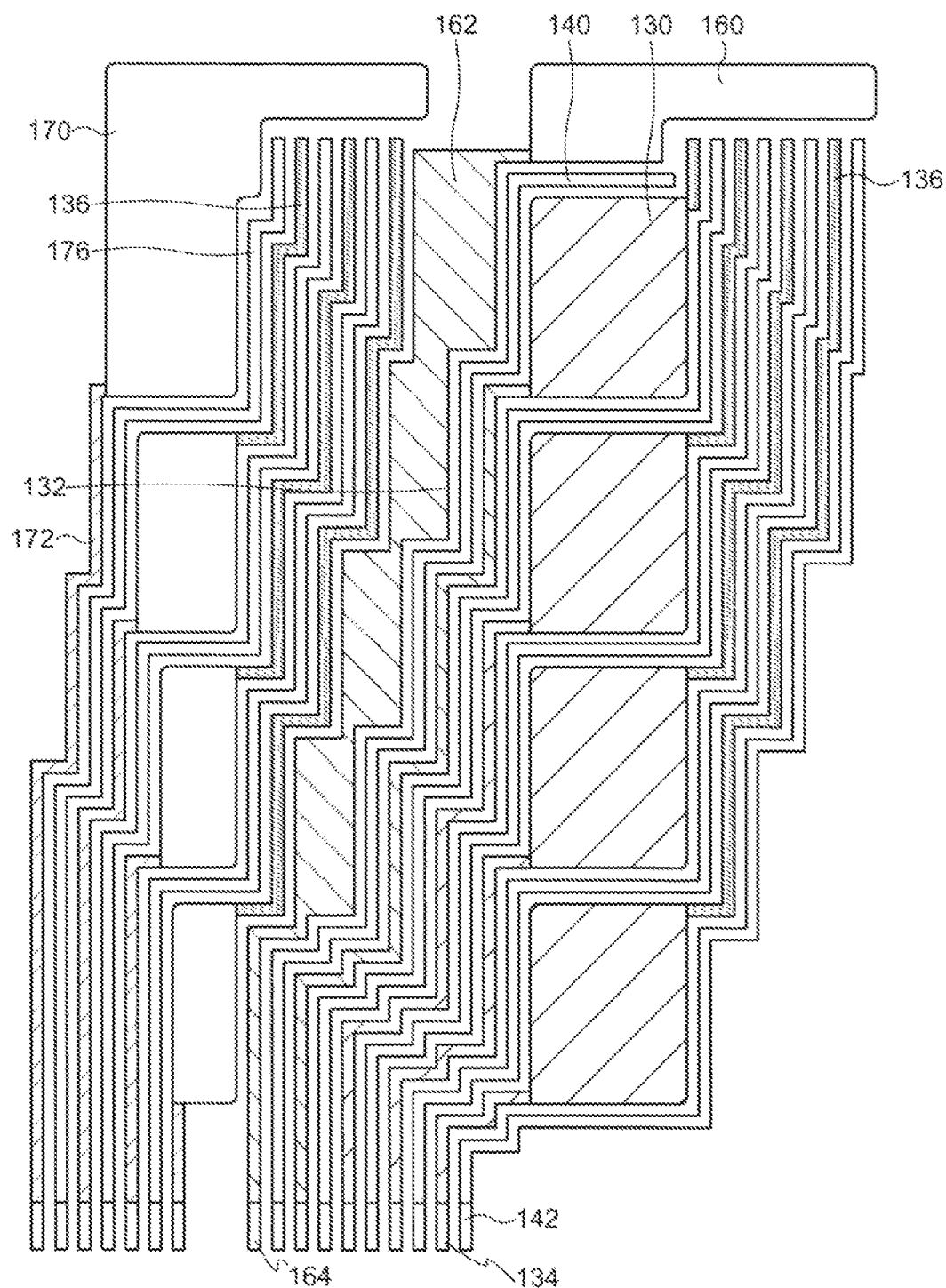
FIG. 11 is a schematic top view of a portion of a sensor module according to an embodiment of the present invention.

Specifically, one first dummy electrode 160 may be provided in each column. In each column, the first dummy electrode 160 is arranged in the frame region on the opposite side (first row side) of the first terminal 134 and the second terminal 142 with respect to the sensor region 150. A pulsed AC voltage of the same phase as the sensor electrodes 130 is also applied to each of the first dummy electrodes 160. Therefore, the first dummy electrode 160 may be electrically connected to the plurality of first active-shield wirings 140. The voltage supply to the first dummy electrodes 160 may be performed using the first active-shield wiring 140 extending between the sensor electrode 130 in the first row and the frame region on the first row side or using a dummy wiring 162 independent from the first active-shield wiring 140 as shown in FIG. 11. At least a portion of the plurality of dummy wirings 162 traverse the sensor region 150. Since the first dummy electrodes 160 do not contribute to the identification of the coordinates of the input means, the first dummy electrodes may not be connected to the detector 116. The width of the dummy wiring 162 may be varied according to the distance from its terminal 164 so that the distance between adjacent first active-shield wiring 140 and auxiliary wiring 136, the distance between adjacent auxiliary wiring 136 and dummy wiring 162, and the distance between adjacent first active-shield wiring 140 and dummy wiring 162 are constant.

Figure 10:
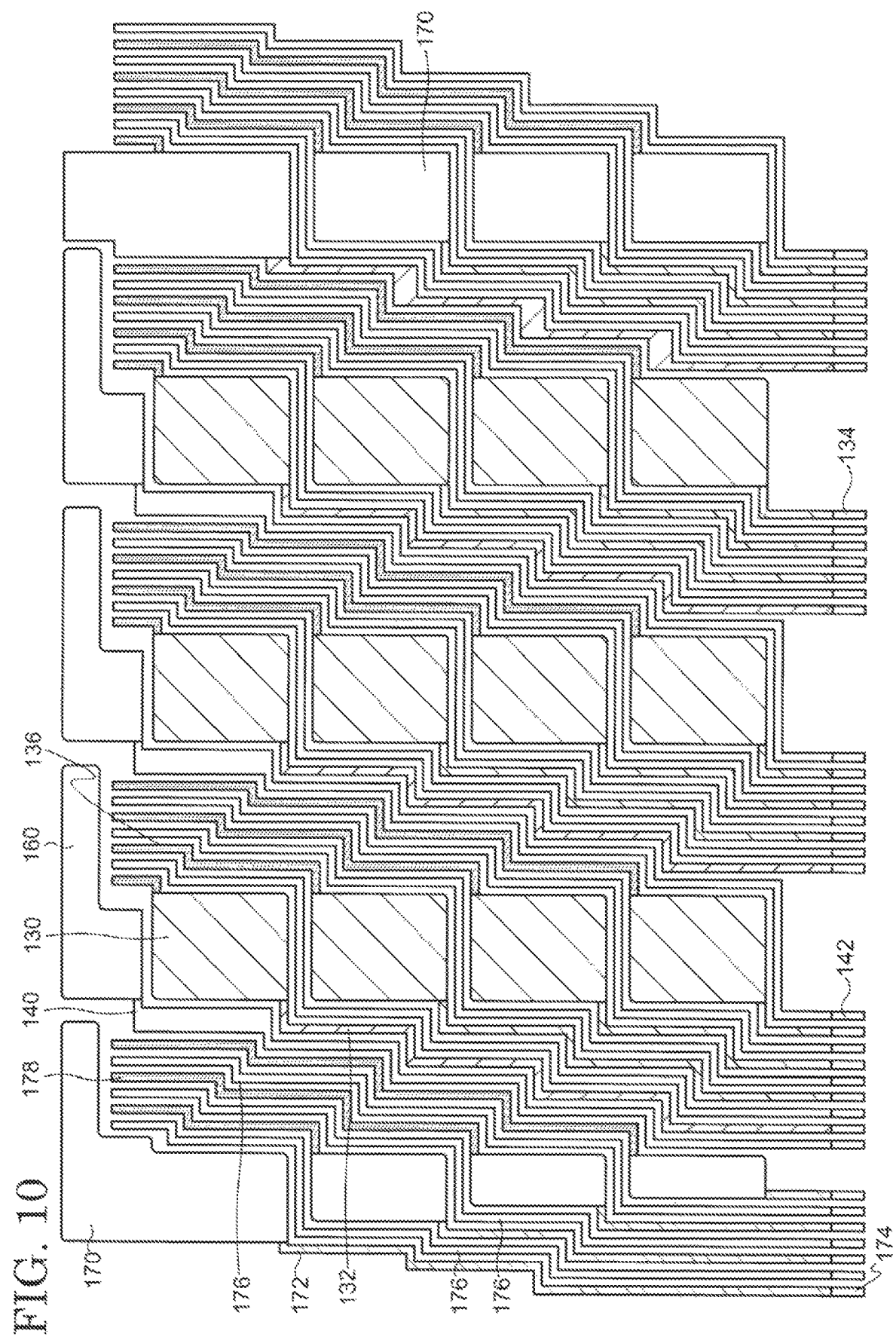
FIG. 10 is a schematic top view of a portion of a sensor module according to an embodiment of the present invention.

Alternatively, a pair of second dummy electrodes 170 may be arranged in each row along with or instead of the first dummy electrodes 160 (FIG. 10). The pair of second dummy electrodes 170 is arranged so as to sandwich all of the sensor electrodes 130 in each row. A dummy wiring 172 is connected to each of the second dummy electrodes 170 and extends in the column direction to form or connect to a terminal 174. A pulsed AC voltage in the same phase as the sensor electrodes 130 is applied to the second dummy electrode 170 via the terminal 174. Thus, the second dummy electrode 170 may be electrically connected to the plurality of first active-shield wirings 140. Since the second dummy electrodes 170 also do not contribute to the identification of the coordinates of the input means, the second dummy electrodes 170 may not be connected to the detector 116.

Similar to the sensor wirings 132, a plurality of frame-shield wirings 176 may be provided as an optional component to reduce the parasitic capacitance between the dummy wirings 172 connected to the second dummy electrodes 170. Specifically, the frame-shield wirings 176 may be provided, which extend in the column direction from the side on which the first terminals 134 and the second terminals 142 are arranged and which extend between the second dummy electrodes 170 adjacent in the column direction. Each frame-shield wiring 176 may be provided to be sandwiched in the column direction by the second dummy electrodes 170 adjacent to each other. Although not illustrated, the frame-shield wirings 176 may be provided so that the frame-shield wirings 176 adjacent to each other sandwich each second dummy electrode 170 in the column direction. A pulsed AC voltage in the same phase as the sensor wirings 132 is also applied to the frame-shield wirings 176. Since the frame-shield wirings 176 also do not contribute to the identification of the coordinates of the input means, the frame-shield wirings 176 may not be connected to the detector 116.

As a further optional component, an auxiliary wiring 178 similar to the auxiliary wiring 136 connected to the sensor electrode 130 may also be connected to the second dummy electrode 170. The auxiliary wiring 178 may be provided to all of the second dummy electrodes 170 but may not be provided to the second dummy electrodes 170 located in the first row. The auxiliary wiring 178 and the frame-shield wiring 176 are arranged to alternate with each other in the row direction.

Since the first dummy electrodes 160 and/or the second dummy electrodes 170 are provided outside the sensor region 150 and are supplied with the same potential as the sensor electrodes 130 in this modified example, no potential difference is generated between the sensor electrodes 130 and the first dummy electrodes 160 and/or between the sensor electrodes 130 and the second dummy electrodes 170, thereby suppressing the noise generation, especially around the sensor region 150. Therefore, even if the input means comes close to the edge portion of the sensor region 150, an electric field is uniformly generated between the input means and the sensor region 150, and a portion of the electric field which overlaps the sensor electrode 130 is detected as a capacitance change, thus enabling detection without variation. In addition, since the capacitance formation between the outside of the sensor region 150 and the input means can be suppressed, detection accuracy is not reduced.

In addition, the plurality of first dummy electrodes 160 and/or the plurality of second dummy electrode 170 are provided. When a single dummy electrode is disposed outside the sensor region 150, the proximity of the input means to an edge portion of the sensor region 150 affects the entire perimeter of the sensor region 150. However, the decrease in the amount of potential fluctuation of the sensor electrodes 130 which occurs when the input means comes into close proximity to the edge portion of the sensor region 150 can be limited to a local area by providing the plurality of first dummy electrodes 160 and/or the plurality of second dummy electrodes 170. Therefore, the detection accuracy can be maintained even at the edge portion of the sensor region 150, and the coordinates of the input means can be more accurately identified.

6. DISPLAY DEVICE

Figure 12:
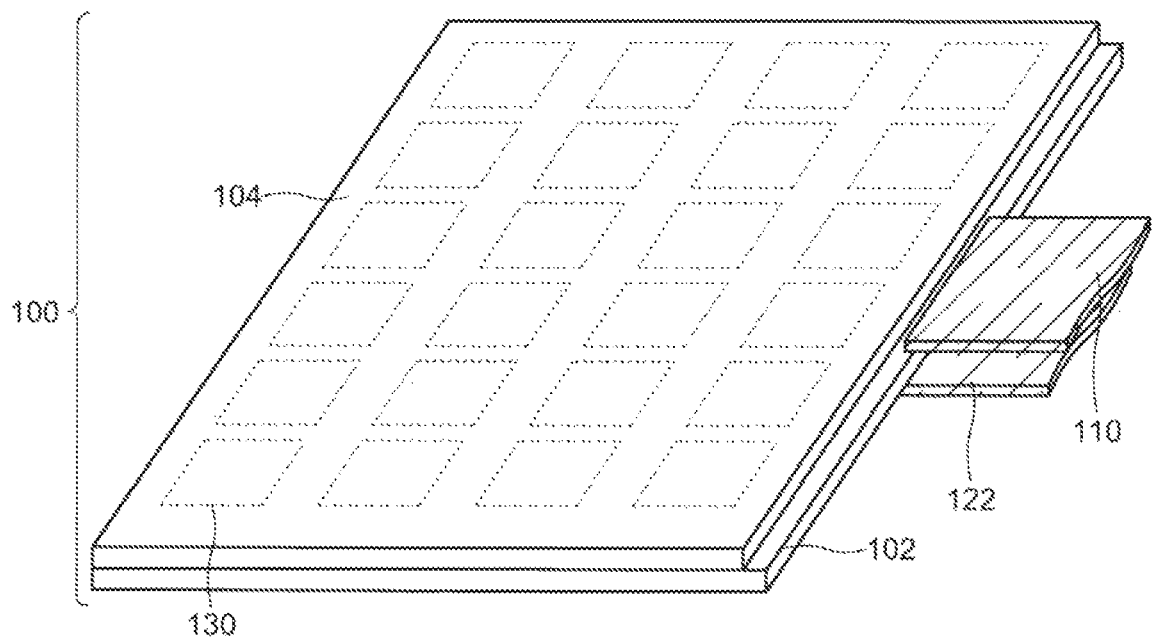
FIG. 12 is a schematic developed view of a display device according to an embodiment of the present invention.
Figure 12:
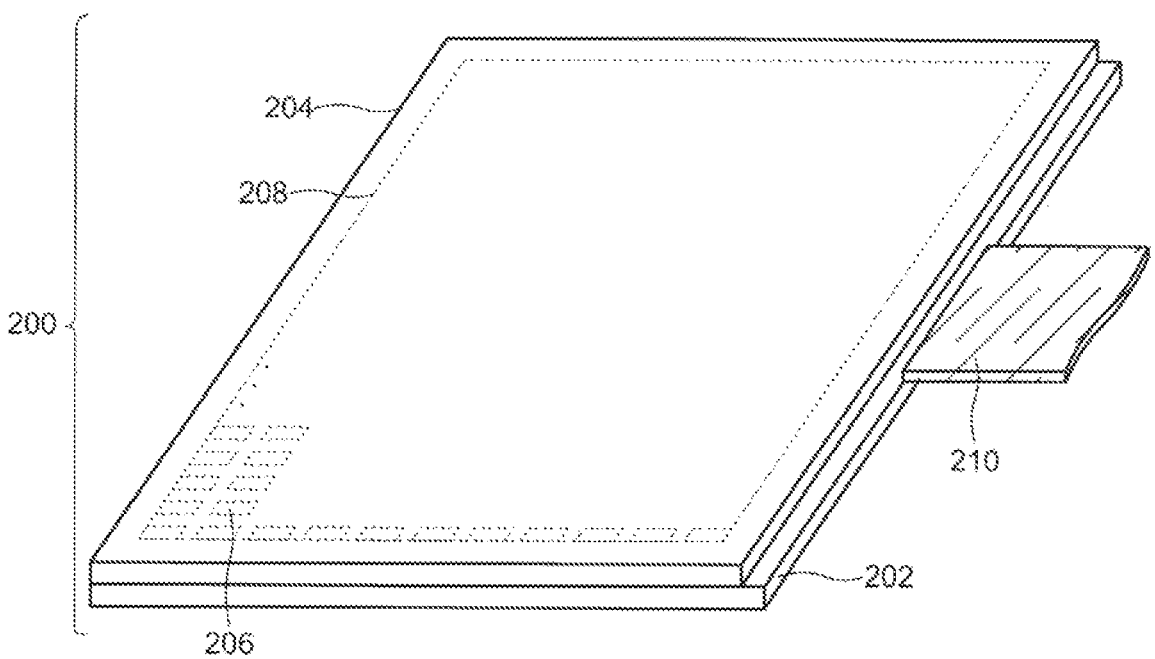

As shown in the schematic developed view in FIG. 12, a display device 300 according to an embodiment of the present invention can be provided by combining the sensor device including the sensor module 100 described above and a display module 200. The display module 200 is a device having a function of displaying images and includes, as its fundamental configuration, an array substrate 202, a plurality of pixels 206 formed over the array substrate 202, and a counter substrate 204 over the array substrate 202. The smallest rectangular region surrounding the plurality of pixels 206 is called a display region 208. Each pixel 206 includes a display element and functions as the smallest unit providing color information. As the display element, an electroluminescence element exemplified by an organic electroluminescent element (OLED) and the like as well as a liquid crystal element may be used. When liquid crystal elements are used, the display module 200 is further provided with a light source (backlight) which is not illustrated. Each pixel 206 is driven according to power and video signals supplied via a connector 210 such as a flexible printed circuit (FPC) board to provide light of a specific color in a gradation based on the video signal. The pixels 206 are controlled on the basis of the video signals, by which an image can be displayed on the display region 208. The display module 200 and the sensor module 100 are fixed to each other by an adhesive layer or the like which is not illustrated. At this time, it is preferable to provide the noise-shield layer 106 described above between the display module 200 and the sensor module 100 to prevent electrical influence by the display module 200.

The size of the display module 200 is not particularly restricted and may be the size called 12.1 inch (31 cm) size used for portable communication terminals, a size suitable for a monitor connected to a computer, television, signage, and the like (for example, 14.1 inch (36 cm) size to 32 inch (81 cm) size), or an even larger size, for example.

Figure 13:
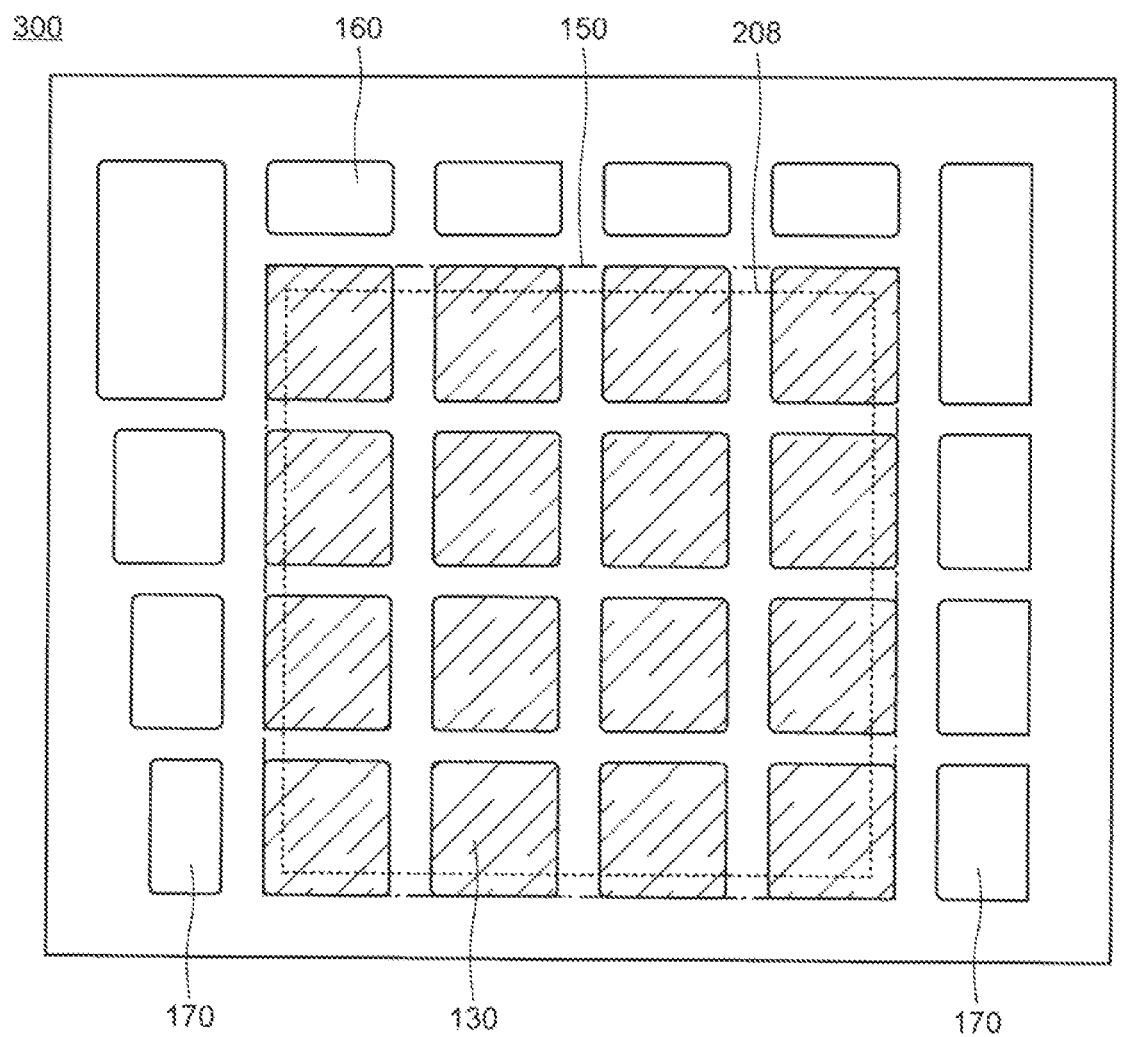
FIG. 13 is a schematic top view of a display device according to an embodiment of the present invention.

In the display device 300, the sensor module 100 may be arranged so that each of the plurality of sensor electrodes 130 overlaps the plurality of pixels 206. For example, the sensor module 100 may be arranged so that the sensor region 150 indicated by the chain line overlaps the entire display region 208 indicated by the dotted line as shown in FIG. 13. The sensor region 150 and the display region 208 may have the same shape. Alternatively, the sensor region 150 may be smaller than the display region 208. In this case, the sensor electrodes 130 are arranged so that the entire sensor region 150 overlaps the display region 208.

When providing the first dummy electrodes 160 and/or the second dummy electrodes 170 demonstrated in the Modified Example 4, it is preferable to configure the display device 300 so that the first dummy electrodes 160 and/or the second dummy electrodes 170 do not overlap the display region 208. Such a configuration of the display device 300 further effectively shields the electrical influences of the display module 200.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process on the basis of the sensor module and the display device according to each embodiment is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:
1. A sensor module comprising:
a plurality of sensor electrodes arranged in a matrix shape having n rows including a first row to an nth row and m columns including a first column to an mth column;
a sensor region encompassing the plurality of sensor electrodes;
a frame region surrounding the sensor region;
a plurality of first terminals and a plurality of second terminals arranged in a region opposite to the nth row located in the frame region;
a plurality of sensor wirings, each of the plurality of sensor wirings electrically connecting a corresponding one of the plurality of sensor electrodes to a corresponding one of the plurality of first terminals;
a plurality of first active-shield wirings electrically independent from the plurality of sensor electrodes, each of the plurality of first active-shield wirings being electrically connected to a corresponding one of the plurality of second terminals and extending in a column direction of the plurality of sensor electrodes from the corresponding one of the plurality of second terminals; and a plurality of auxiliary wirings electrically connected to the corresponding plurality of sensor electrodes, respectively, and extending from the corresponding plurality of sensor electrodes to the frame region on a side of the first row, wherein two first active-shield wirings of the plurality of first active-shield wirings are directly adjacent to each other and sandwich one of the plurality of sensor wirings in a row direction of the plurality of sensor electrodes, each of the auxiliary wirings is sandwiched in the column direction by the first active-shield wirings adjacent to each other, and m and n are independent from each other and are integers equal to or greater than 2.

2. The sensor module according to claim 1,
wherein the plurality of sensor wirings and the plurality of first active-shield wirings alternate each other.

3. The sensor module according to claim 1,
wherein at least a portion of the plurality of first active-shield wirings traverses the sensor region.

4. The sensor module according to claim 1,
wherein each of the plurality of sensor electrodes is sandwiched in the column direction by the first active-shield wirings adjacent to each other.

5. The sensor module according to claim 1,
wherein the plurality of sensor wirings and the plurality of first active-shield wirings are configured to be applied with a pulsed AC voltage in the same phase.

6. The sensor module according to claim 1,
wherein the plurality of sensor electrodes, the plurality of sensor wirings, and the plurality of first active-shield wirings exist in the same layer as one another.

7. The sensor module according to claim 1,
wherein the plurality of sensor electrodes, the plurality of sensor wirings, the plurality of first active-shield wirings, and the plurality of auxiliary wirings exist in the same layer as one another.

8. The sensor module according to claim 1,
wherein the plurality of first active-shield wirings and the plurality of auxiliary wirings alternate each other in the row direction.

9. The sensor module according to claim 1, further comprising:
a dummy electrode located in the frame region on a side of the first row in each of the first column to the mth column; and
a plurality of dummy wirings electrically connected to the corresponding dummy electrodes, respectively, and extending in the column direction.

10. The sensor module according to claim 9,
wherein at least one of the dummy wirings transverses the sensor region.

11. The sensor module according to claim 9,
wherein, in each of the first column to the nth column, one of the plurality of first active-shield wirings is sandwiched in the column direction by the dummy electrode and the first sensor electrode.

12. The sensor module according to claim 1, further comprising:
a pair of dummy electrodes located in the frame region and sandwiching the plurality of sensor electrodes in each of the first row to the mth row, a plurality of dummy wirings electrically connected to the corresponding dummy electrodes, respectively, and extending in the column direction from the corresponding dummy electrodes; and a plurality of frame-shield wirings electrically independent from the dummy electrodes, wherein the plurality of dummy wirings and the plurality of frame-shield wirings alternate each other in the row direction.

13. The sensor module according to claim 12, further comprising a plurality of frame auxiliary wirings electrically connected to the corresponding dummy electrodes, respectively, and extending in an opposite direction to an extending direction of the dummy wirings from the corresponding dummy electrodes, wherein the plurality of frame auxiliary wirings and the plurality of frame-shield wirings alternate each other in the row direction.

14. A sensor device comprising:
the sensor module according to claim 1;
a connector electrically connected to the plurality of terminals; and
a control circuit mounted over the connector and configured to sense a potential fluctuation of the plurality of sensor electrodes.

15. A display device comprising:
a display module comprising a plurality of pixels; and
the sensor device according to claim 14 mounted over the display module.

16. A sensor module comprising:
a plurality of sensor electrodes arranged in a matrix shape having n rows including a first row to an nth row and m columns including a first column to an mth column;
a sensor region encompassing the plurality of sensor electrodes;
a frame region surrounding the sensor region;
a plurality of first terminals and a plurality of second terminals arranged in a region opposite to the nth row located in the frame region;
a plurality of sensor wirings, each of the plurality of sensor wirings electrically connecting a corresponding one of the plurality of sensor electrodes to a corresponding one of the plurality of first terminals;
a plurality of first active-shield wirings electrically independent from the plurality of sensor electrodes, each of the plurality of first active-shield wirings being electrically connected to a corresponding one of the plurality of second terminals and extending in a column direction of the plurality of sensor electrodes from the corresponding one of the plurality of second terminals;
a plurality of auxiliary wirings electrically connected to the corresponding plurality of sensor electrodes, respectively, and extending from the corresponding plurality of sensor electrodes to the frame region on a side of the first row; and
a plurality of second active-shield wirings extending from the frame region on the side of the first row, wherein two first active-shield wirings of the plurality of first active-shield wirings are directly adjacent to each other and sandwich one of the plurality of sensor wirings in a row direction of the plurality of sensor electrodes, each of the plurality of auxiliary wirings is sandwiched in the row direction by the second active-shield wirings adjacent to each other, and m and n are independent from each other and are integers equal to or greater than 2.

17. The sensor module according to claim 16,
wherein the plurality of second active-shield wirings is electrically connected to each other in the frame region on the side of the first row.

18. A sensor module comprising:
a plurality of sensor electrodes arranged in a matrix shape having n rows including a first row to an nth row and m columns including a first column to an mth column;
a sensor region encompassing the plurality of sensor electrodes;
a frame region surrounding the sensor region;
a plurality of first terminals and a plurality of second terminals arranged in a region opposite to the nth row located in the frame region;
a plurality of sensor wirings, each of the plurality of sensor wirings electrically connecting a corresponding one of the plurality of sensor electrodes to a corresponding one of the plurality of first terminals;
a plurality of first active-shield wirings electrically independent from the plurality of sensor electrodes, each of the plurality of first active-shield wirings being electrically connected to a corresponding one of the plurality of second terminals and extending in a column direction of the plurality of sensor electrodes from the corresponding one of the plurality of second terminals;
a dummy electrode located in the frame region on a side of the first row in each of the first column to the mth column; and
a plurality of dummy wirings electrically connected to the corresponding dummy electrodes, respectively, and extending in the column direction,
wherein two first active-shield wirings of the plurality of first active-shield wirings are directly adjacent to each other and sandwich one of the plurality of sensor wirings in a row direction of the plurality of sensor electrodes, and
m and n are independent from each other and are integers equal to or greater than 2.

19. The sensor module according to claim 18,
wherein at least one of the dummy wirings transverses the sensor region.

20. The sensor module according to claim 18,
wherein, in each of the first column to the nth column, one of the plurality of first active-shield wirings is sandwiched in the column direction by the dummy electrode and the first sensor electrode.

* * * * *